Dec. 21, 1948.  J. A. HOLBROOK  2,456,942
POWER TRANSMISSION FOR HELICOPTER ROTORS
Filed Jan. 26, 1944  2 Sheets-Sheet 1

Inventor
JOHN A. HOLBROOK
By Albert G. Blodgett
Attorney

Dec. 21, 1948.  J. A. HOLBROOK  2,456,942
POWER TRANSMISSION FOR HELICOPTER ROTORS
Filed Jan. 26, 1944  2 Sheets—Sheet 2

Inventor
JOHN A. HOLBROOK
By Albert G. Blodgett
Attorney

Patented Dec. 21, 1948

2,456,942

UNITED STATES PATENT OFFICE 2,456,942

POWER TRANSMISSION FOR HELICOPTER ROTORS

John A. Holbrook, Worcester, Mass., assignor to Worcester Polytechnic Institute, Worcester, Mass., a corporation of Massachusetts Application January 26, 1944, Serial No. 519,698

7 Claims. (Cl. 170—135.5)

1

This invention relates to helicopters, and more particularly to flying machines of the type having a lifting rotor which is driven by means of an internal combustion engine.

In such machines as heretofore constructed, separate manually operable devices have been provided to control respectively the speed of the engine and the application of the engine power to the rotor. This arrangement is by no means fool-proof, and very accurate coordination is required between the two control devices, particularly when first taking off from the ground. If too great a torque is suddenly applied to the rotor before it has had time to attain an appreciable speed of rotation, serious damage to the rotor structure may result. Furthermore, under these circumstances the torque reaction may be sufficient to swing the entire machine around relative to the ground, which would obviously be exceedingly dangerous. In attempting to overcome these problems, other difficulties are encountered, particularly in connection with the necessity for fast idling of a cold engine until it has been properly warmed up for a take off, and the desirability of cruising or hovering with the engine operating at reduced speed to economize on fuel.

It is accordingly one object of the invention to provide a helicopter which will be relatively simple and fool-proof in operation.

It is a further object of the invention to provide a helicopter of the type having a lifting rotor driven by an internal combustion engine, in which the application of power to the rotor will be automatically controlled in the proper manner.

It is a further object of the invention to provide a helicopter so constructed as to facilitate warming up of its engine in a safe manner by an ordinary mechanic.

It is a further object of the invention to provide a helicopter so constructed that the engine driven rotor can be operated safely at a reduced speed to save fuel when cruising or hovering.

With these and other objects in view, as will be apparent to those skilled in the art, the invention resides in the combination of parts set forth in the specification and covered by the claims appended hereto.

Figure 1:
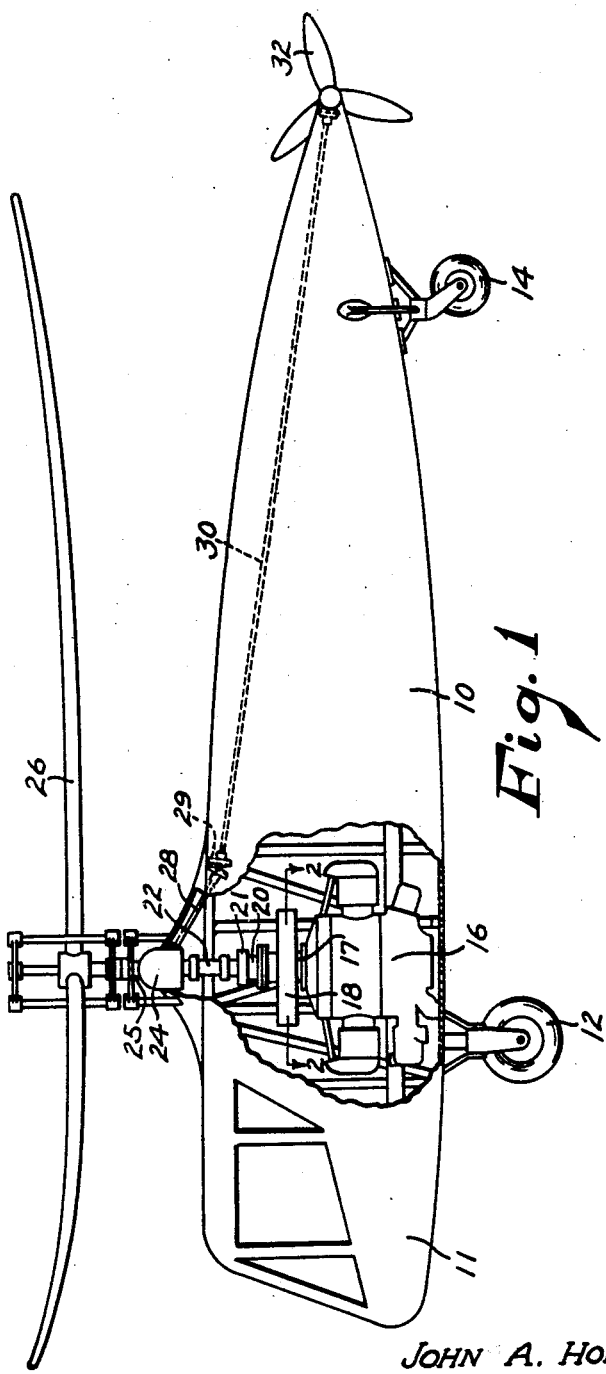
Figure 2:
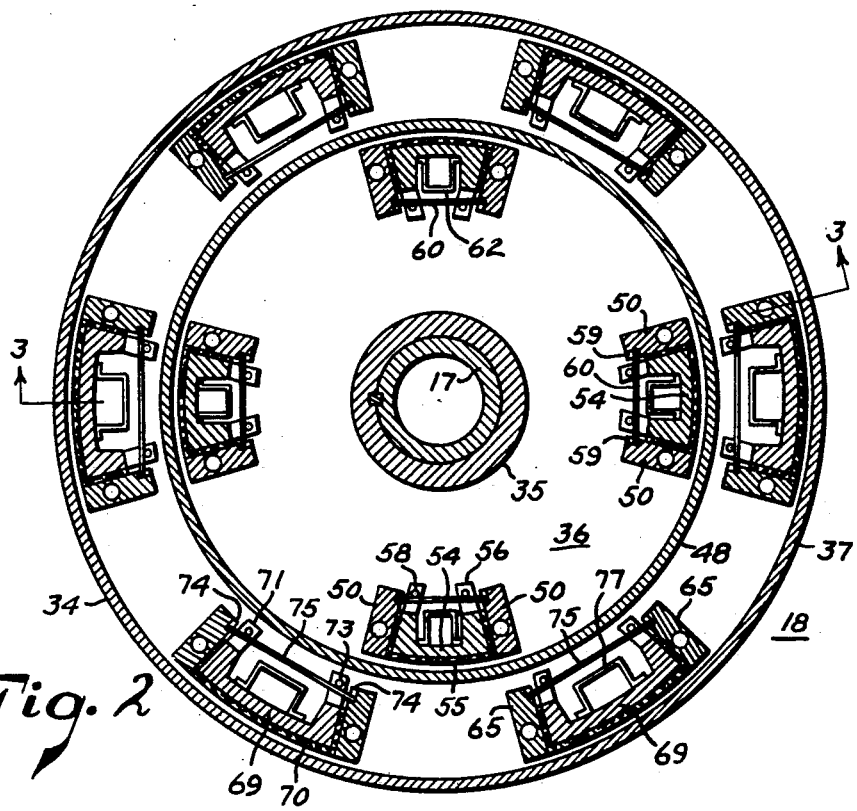
Figure 3:
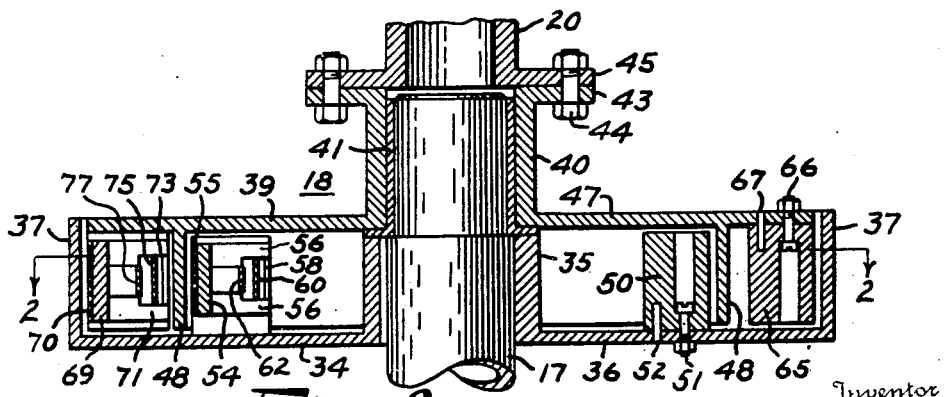

Referring to the drawings illustrating one embodiment of the invention and in which like reference numerals indicate like parts, Fig. 1 is a side elevation of a helicopter, with certain parts broken away for clearness of illustration;

Fig. 2 is a section taken as indicated by the lines 2—2 in Fig. 1 and in Fig. 3; and Fig. 3 is a section on the line 3—3 in Fig. 2.

As shown in Fig. 1, the embodiment illustrated comprises a horizontally elongated fuselage 10 having a pilot's compartment 11 in its front end

2 or nose. Suitable landing gear is provided in the form of two front wheels 12 (one only being shown) arranged side by side beneath the front portion of the fuselage, and a single rear wheel 14 beneath the tail portion thereof. In the lower portion of the fuselage and closely behind the pilot's compartment 11 there is mounted an internal combustion engine 16 having an upright rotatable power delivery shaft 17. The speed of this engine can be controlled by the usual throttle-regulating lever (not shown) located in the pilot's compartment. The upper end of the engine shaft 17 is connected directly to a centrifugal clutch mechanism 18 which is connected by a shaft 20 to a suitable one-way or "free-wheeling" rotary clutch 21. This clutch 21 is connected by a universal or "Spicer" shaft 22 to a speed-reducing gear unit 24 located in the upper portion of the fuselage and above the engine 16. One power delivery shaft 25 extends upwardly from the gear unit and is suitably connected to the hub of a three-bladed lifting rotor 26 arranged to revolve in a generally horizontal plane. Suitable means of known construction is provided whereby the pilot may vary the pitch of the rotor blades and the inclination of its axis, so that the helicopter may travel vertically or horizontally in any desired direction. A second power delivery shaft 28 extends rearwardly from the gear unit 24 and is connected through bevel gearing 29 and a shaft 30 to a relatively small torque-balancing propeller 32 mounted on the tail of the fuselage 10. This propeller rotates about a substantially horizontal axis extending transversely with respect to the longitudinal axis of the fuselage. Suitable means of known construction is provided for varying the pitch of the blades of the propeller 32, under the control of the pilot. In this manner the pilot can prevent the fuselage 10 from turning in a horizontal plane, when the machine is in flight, by reason of the reaction to the torque applied to the rotor 26.

Referring now to Figs. 2 and 3 which illustrate in detail the construction of the centrifugal clutch mechanism 18, it will be seen that this mechanism comprises a driving member 34 having a central hub 35 keyed to the engine shaft 17. A web 36 extends outwardly from this hub, and a cylindrical flange 37 extends upwardly from the outer margin of the web 36 to form a drum with a cylindrical inner surface. The clutch mechanism 18 also comprises a driven member 39 having a central hub 40 rotatably supported on a sleeve 41, this sleeve being mounted on the upper portion of the engine shaft 17 directly above the hub 35. The upper end of the hub 40 is provided with a flange 43 which is fastened by means of bolts 44 to a flange 45 on the lower end of the shaft 20. At the lower end of the hub 40 there is provided an outwardly extending web 47 from which a cylindrical flange 48 extends downwardly to form a drum with a cylindrical inner surface. The drum 48 is considerably smaller in diameter than the drum 37, and these drums overlap in the vertical direction. The web 47 extends outwardly beyond the drum 48 and nearly to the inner surface of the outer drum 37.

Centrifugally actuated friction devices are employed to transmit torque from the driving member 34 to the driven member 39 and thence through the gear unit 24 to the rotor 26 and the propeller 32. For this purpose a series of circumferentially spaced abutments in the form of blocks 50 are fastened to the upper surface of the web 36 by means of bolts 51 and dowel pins 52. These blocks are located close to the inner surface of the inner drum 48, and they form pockets for the reception of friction shoes 54. In the particular embodiment illustrated there are eight of these blocks 50 and four of the shoes 54, which I call "primary" shoes. Each shoe 54 is preferably in the form of a metal body of generally arcuate shape covered on its outer surface and ends with a layer 55 of a suitable friction material. Two pairs of vertically spaced ears 56 project inwardly from opposite ends of each shoe, the ears of each pair being connected by a vertical pin 58. The blocks 50 are provided with recesses 59 to receive the ends of flat springs 60 which extend between the ears 56 on the outer side of the pins 58. These springs engage the pins 58 and thus resist outward movement of the shoes 54. U-shaped devices 62 are secured to the inner side of each shoe 54 to limit outward flexing of the springs 60 under the influence of centrifugal force on the springs themselves at very high speeds, thereby preventing the ends of the springs from withdrawing from the recesses 59. It will be noted that the primary shoes 54 always revolve at the speed of the driving member 34.

Additional centrifugally actuated friction devices are provided to revolve at the speed of the driven member 39. For this purpose a series of circumferentially spaced abutments in the form of blocks 65 are fastened to the lower surface of the web 47 by means of bolts 66 and dowel pins 67. These blocks are located close to the inner surface of the outer drum 37, and they form pockets for the reception of friction shoes 69. In the particular embodiment illustrated there are twelve of these blocks 65 and six of the shoes 69, which I call "secondary" shoes. The secondary shoes are similar in general construction to the primary shoes, but they are shown somewhat larger and heavier than the primary shoes. As illustrated each shoe 69 is in the form of a generally arcuate metal body covered on its outer surface and ends with a layer 70 of a suitable friction material. Two pairs of vertically spaced ears 71 project inwardly from opposite ends of each shoe, with a vertical pin 73 connecting the ears of each pair. Recesses 74 are provided in the blocks 65 to receive the ends of flat springs 75 which extend between the ears 71 on the outer side of the pins 73. By engaging the pins these springs resist outward movement of the shoes 69. U-shaped devices 77 mounted on the inner sides of the shoes prevent excessive outward flexing of the springs with resultant withdrawal of their ends from the recesses 74.

The characteristics of the centrifugal clutch mechanism 18 bear a predetermined relationship to the characteristics of the engine 18. In order to make this relationship clear, certain characteristics will be assumed for the engine by way of illustration only, but these assumptions are not to be construed as limitations. It will be assumed that the engine shaft 17 will rotate at a maximum of 1800 revolutions per minute (R. P. M.) when the helicopter is in normal flight, and this will be referred to as the "cruising speed" of the engine. Ordinarily under these conditions the engine throttle will be only partially open, and the engine can be operated safely at greater speeds, up to say 2500 R. P. M., but at a sacrifice in that the useful life of the engine will be reduced. When the engine is fully warmed up it will idle at say 800 R. P. M., which will be referred to as the "hot idling speed." When the engine is cold and first started it will idle at say 1200 R. P. M., which will be referred to as the "cold idling speed." Furthermore, to prevent stalling of a cold engine it will be necessary to "gun" it occasionally with momentary bursts of speed running up to substantially the cruising speed. With such an engine the springs 60 for the primary shoes 54 will be constructed to allow engagement of these shoes with the drum 48 when the speed of the driving member 34 exceeds approximately 1400 R. P. M., which will be referred to as the "primary engaging speed." It will be noted that this speed is slightly higher than the cold idling speed. The springs 75 for the secondary shoes 69 will be constructed to allow engagement of these shoes with the drum 37 when the speed of the driven member 39 exceeds approximately 900 R. P. M., which will be referred to as the "secondary engaging speed." It will be noted that this speed is one half the cruising speed.

The torque which will be transmitted by the clutch mechanism is a function of the coefficient of friction between the shoes and their respective drums, the weight of the shoes, the number of shoes in each set, the radius of gyration of the shoes in each set, the radius of the inner surface of each drum, and the speed of revolution in R. P. M. In general, it may be said that the torque transmitted through each set of shoes, once they are in engagement with the corresponding drum, will vary directly as the coefficient of friction, the weight of each shoe, the number of shoes, the radius of gyration of the shoes, the radius of the drum, and the square of the speed of revolution of the shoes in R. P. M., with slight modifications due to the effect of the springs. By utilizing well known formulas, the torque for any known set of conditions can be predetermined. In the embodiment illustrated the secondary shoes 69, as compared with the primary shoes 50, are greater in weight, greater in number, have a greater radius of gyration, and engage a drum of greater radius. Consequently, with the same coefficient of friction and the same speed in R. P. M., the secondary shoes will transmit a much greater torque than the primary shoes. The construction is preferably such that the primary shoes, when revolving at the cruising speed of 1800 R. P. M., are capable of transmitting approximately twenty-five per cent (25%) of the maximum torque available from the engine at cruising speed with fully open throttle, which will be referred to as "full engine torque." The secondary shoes, when revolving at the cruising speed of 1800 R. P. M., are capable of transmitting approximately eighty-five per cent (85%) of the full engine torque. Thus with both sets of shoes revolving at the cruising speed, a torque transmitting capacity of approximately 110% of the full engine torque is available, affording a safety margin of 10% to prevent the possibility of clutch slippage even with the engine throttle fully open. While the torque capacity of the primary shoes at cruising speed is preferably approximately 25% of the full engine torque, this percentage may be varied within rather wide limits, as for example from 15% to 40%, depending on other characteristics of the helicopter. A higher percentage has the advantage of more rapid acceleration of the lifting rotor and quicker take-offs, but it has the disadvantage of increasing the danger of damage to the rotor and of swinging the fuselage around relative to the ground. The lifting rotor has much greater strength to resist torsion when it is revolving rapidly and its arms are tensioned by centrifugal force than when it is stationary. In general, the larger the torque capacity of the primary shoes, the smaller I may make the torque capacity of the secondary shoes, but in any event the capacity of the secondary shoes should exceed that of the primary shoes, and the total capacity of both sets of shoes should exceed the full engine torque.

The operation of the invention will now be apparent from the above disclosure. When the engine 16 is first started and is still comparatively cold, it will idle at 1200 R. P. M., and the springs 60 will prevent engagement of the primary shoes 54 with the drum 48. Consequently the lifting rotor 26 will remain stationary, and there will be no wear or heating of the shoes and drums. While occasional "gunning" of the cold engine to prevent stalling may bring the primary shoes into momentary contact with the drum, this contact will be too brief to cause any appreciable wear. Furthermore, the torque capacity of these shoes is so low that no overstressing of the rotor or swinging around of the fuselage can occur. When the motor has been sufficiently warmed up and the pilot wishes to take off, he will merely open the throttle and increase the speed of the engine and of the driving member 34 to approximately the cruising speed of 1800 R. P. M. The blocks 50 will compel the primary shoes 54 to revolve at the same speed as the engine, and as soon as this speed reaches 1400 R. P. M. these shoes will engage the drum 48 of the driven member 39 and transmit torque through the gear unit 24 to the lifting rotor 26 and to the propeller 32, which is preferably adjusted for maximum pitch. The various driven parts will accelerate gradually at a rate limited by the capacity of the primary shoes, and since this capacity is relatively low even at 1800 R. P. M., the lifting rotor will not be overstressed, nor will the torque reaction be sufficient to swing the fuselage around. When the speed of the driven member 39 reaches 900 R. P. M. the speed of the lifting rotor will be sufficient to increase its strength to a point such that it can safely withstand much greater driving torque. Also the speed of the propeller 32 will be sufficient to give it an effective "bite" on the air and thus enable it to resist considerable torque reaction. At this speed the centrifugal force on the secondary shoes 69, which are compelled by the blocks 65 to revolve at the same speed as the driven member 39, will be sufficient to overcome the springs 75. Accordingly the secondary shoes will move outwardly into engagement with the drum 37, increasing the torque transmitted by the clutch and increasing the rate of acceleration of the driven member. Since the torque transmitted by the secondary shoes varies approximately as the square of the speed, the rate of acceleration of the driven member will increase as its speed increases. Consequently the speed of the driven member will very quickly reach 1800 R. P. M., which is the same speed as the engine, and the clutch will be fully engaged and capable of transmitting the full engine torque without slippage of either set of shoes. The pilot can now take off from the ground by adjusting the blades of the lifting rotor 26 to positive pitch and if necessary opening the engine throttle still further. He will also adjust the pitch of the propeller 32 to provide the proper balancing force for the torque reaction of the lifting rotor.

Once the machine is in flight, the pilot can safely reduce the engine speed and thereby economize on fuel if desired. The primary shoes will disengage when the speed drops below 1400 R. P. M., but the secondary shoes will remain in engagement so long as the speed remains above 900 R. P. M., and their capacity is ample to drive the rotor with the engine throttle only partially open, as would be the case at these low speeds. If more speed is desired at any time, it is merely necessary to open the throttle and accelerate the engine, and as soon as the speed has reached 1400 R. P. M. the primary shoes will again move into engagement.

In the case of engine failure while the machine is in flight, the pilot can reverse the pitch of the lifting rotor 26 and thus allow this rotor to be driven freely in a forward direction by the air pressure on its blades. The free-wheeling clutch 21 will permit the rotor to revolve without driving the engine shaft, as would otherwise occur through the action of the secondary shoes at speeds above 900 R. P. M. Under these circumstances the machine will be sustained to a considerable extent by the action of the rotor, and it will descend by gravity at a comparatively safe speed.

It will be recognized that the invention provides a helicopter having great practical advantages. The controls are so simplified that the operation is substantially fool-proof. The application of power is controlled solely by the engine throttle lever, and no damage can be done no matter how this lever is manipulated, since the application of the driving torque is automatically controlled in accordance with the speed of the engine and of the lifting rotor.

Having thus described my invention, what I claim as new and desire to secure by Letters Patent is:

1. In combination, a helicopter lifting rotor, a rotatable driving element including a substantially cylindrical drum, a rotatable driven element coaxial with the driving element and also including a substantially cylindrical drum, means connecting the driven element to the lifting rotor to revolve the same, a set of primary friction shoes revoluble with the driving element and movable outwardly by centrifugal force into engagement with the inner surface of the drum of the driven member, spring means restraining outward movement of the primary shoes to establish a primary engaging speed, a set of secondary friction shoes revoluble with the driven element and movable outwardly by centrifugal force into engagement with the inner surface of the drum of the driving member, and spring means restraining outward movement of the secondary shoes to establish a secondary engaging speed appreciably less than the said primary engaging speed.

2. In combination, a helicopter lifting rotor, an internal combustion engine having a predetermined cold idling speed and a predetermined cruising speed, a rotatable driving element actuated by the engine and including a substantially cylindrical drum, a rotatable driven element coaxial with the driving element and also including a substantially cylindrical drum, means connecting the driven element to the lifting rotor to revolve the same, a set of primary friction shoes revoluble with the driving element and movable outwardly by centrifugal force into engagement with the inner surface of the drum of the driven member, spring means restraining outward movement of the primary shoes to establish a primary engaging speed slightly higher than the said cold idling speed, a set of secondary friction shoes revoluble with the driven element and movable outwardly by centrifugal force into engagement with the inner surface of the drum of the driving member, and spring means restraining outward movement of the secondary shoes to establish a secondary engaging speed appreciably less than the said cruising speed.

3. In combination, a helicopter lifting rotor, an internal combustion engine having a predetermined cold idling speed and a predetermined cruising speed, a rotatable driving element actuated by the engine and including a substantially cylindrical drum, a rotatable driven element coaxial with the driving element and also including a substantially cylindrical drum, means connecting the driven element to the lifting rotor to revolve the same, a set of primary friction shoes revoluble with the driving element and movable outwardly by centrifugal force into engagement with the inner surface of the drum of the driven member, spring means restraining outward movement of the primary shoes to establish a primary engaging speed slightly higher than the said cold idling speed, a set of secondary friction shoes revoluble with the driven element and movable outwardly by centrifugal force into engagement with the inner surface of the drum of the driving member, and spring means restraining outward movement of the secondary shoes to establish a secondary engaging speed approximately one half the said cruising speed.

4. In combination, a helicopter lifting rotor, an internal combustion engine having a predetermined cold idling speed, a predetermined cruising speed, and a predetermined full engine torque, a rotatable driving element actuated by the engine and including a substantially cylindrical drum, a rotatable driven element coaxial with the driving element and also including a substantially cylindrical drum, means connecting the driven element to the lifting rotor to revolve the same, a set of primary friction shoes revoluble with the driving element and movable outwardly by centrifugal force into engagement with the inner surface of the drum of the driven member, spring means restraining outward movement of the primary shoes to establish a primary engaging speed slightly higher than the said cold idling speed, a set of secondary friction shoes revoluble with the driven element and movable outwardly by centrifugal force into engagement with the inner surface of the drum of the driving member, and spring means restraining outward movement of the secondary shoes to establish a secondary engaging speed appreciably less than the said cruising speed, the primary shoes having a torque transmitting capacity when revolving at the said cruising speed equivalent to between fifteen per cent and forty per cent of the full engine torque, and the secondary shoes having a torque transmitting capacity when revolving at the said cruising speed sufficient to provide in conjunction with the primary shoes a total torque transmitting capacity in excess of the full engine torque.

5. In combination, a helicopter lifting rotor, an internal combustion engine having a predetermined cold idling speed, a predetermined cruising speed, and a predetermined full engine torque, a rotatable driving element actuated by the engine and including a substantially cylindrical drum, a rotatable driven element coaxial with the driving element and also including a substantially cylindrical drum, means connecting the driven element to the lifting rotor to revolve the same, a set of primary friction shoes revoluble with the driving element and movable outwardly by centrifugal force into engagement with the inner surface of the drum of the driven member, spring means restraining outward movement of the primary shoes to establish a primary engaging speed slightly higher than the said cold idling speed, a set of secondary friction shoes revoluble with the driven element and movable outwardly by centrifugal force into engagement with the inner surface of the drum of the driving member, and spring means restraining outward movement of the secondary shoes to establish a secondary engaging speed appreciably less than the said cruising speed, the primary shoes having a torque transmitting capacity when revolving at the said cruising speed equivalent to approximately twenty-five per cent of the full engine torque, and the secondary shoes having a torque transmitting capacity when revolving at the said cruising speed equivalent to more than seventy-five per cent of the full engine torque.

6. In combination, a helicopter lifting rotor, an internal combustion engine having a predetermined cold idling speed, a predetermined cruising speed, and a predetermined full engine torque, a rotatable driving element actuated by the engine and including a substantially cylindrical drum, a rotatable driven element coaxial with the driving element and also including a substantially cylindrical drum, means connecting the driven element to the lifting rotor to revolve the same, a set of primary friction shoes revoluble with the driving element and movable outwardly by centrifugal force into engagement with the inner surface of the drum of the driven member, spring means restraining outward movement of the primary shoes to establish a primary engaging speed slightly higher than the said cold idling speed, a set of secondary friction shoes revoluble with the driven element and movable outwardly by centrifugal force into engagement with the inner surface of the drum of the driving member, and spring means restraining outward movement of the secondary shoes to establish a secondary engaging speed approximately one half the said cruising speed, the primary shoes having a torque transmitting capacity when revolving at the said cruising speed equivalent to approximately twenty-five per cent of the full engine torque, and the secondary shoes having a torque transmitting capacity when revolving at the said cruising speed equivalent to more than seventy-five per cent of the full engine torque.

7. In combination, a helicopter lifting rotor, an internal combustion engine having a predetermined cold idling speed, a predetermined cruising speed, and a predetermined full engine torque, a rotatable driving element actuated by the engine and including a substantially cylindrical drum, a rotatable driven element coaxial with the driving element and also including a substantially cylindrical drum, the drum of the driving element being appreciably larger in diameter than the drum of the driven element, means connecting the driven element to the lifting rotor to revolve the same, a set of primary friction shoes revoluble with the driving element and movable outwardly by centrifugal force into engagement with the inner surface of the drum of the driven member, spring means restraining outward movement of the primary shoes to establish a primary engaging speed slightly higher than the said cold idling speed, a set of secondary friction shoes revoluble with the driven element and movable outwardly by centrifugal force into engagement with the inner surface of the drum of the driving member, and spring means restraining outward movement of the secondary shoes to establish a secondary engaging speed appreciably less than the said cruising speed, the secondary shoes having a torque transmitting capacity appreciably greater than that of the primary shoes when both sets of shoes are revolving at the said cruising speed, and the total torque transmitting capacity of both sets of shoes when revolving at the said cruising speed being in excess of the full engine torque.

JOHN A. HOLBROOK.

REFERENCES CITED

The following references are of record in the file of this patent:

UNITED STATES PATENTS

| Number | Name | Date |
|---|---|---|
| 829,128 | Sturtevant et al. | Aug. 21, 1906 |
| 1,744,637 | Jacobs et al. | Jan. 21, 1930 |
| 1,817,542 | Bethenod et al. | Aug. 4, 1931 |
| 1,870,649 | Rawson | Aug. 9, 1932 |
| 1,994,488 | Sikorsky | Mar. 19, 1935 |
| 2,121,663 | Haupt | June 21, 1938 |
| 2,237,297 | Banker | Apr. 8, 1941 |
| 2,317,340 | Bennett | Apr. 27, 1943 |
| 2,340,241 | Woods | Jan. 25, 1944 |